March 3, 1959 R. W. GOHRKE ET AL 2,875,913
ARTICULATED CLAMPING ASSEMBLY
Filed March 4, 1957 3 Sheets-Sheet 1

INVENTORS
RAY W GOHRKE
NORMAN D THOMPSON
BY
ATTORNEY

March 3, 1959   R. W. GOHRKE ET AL   2,875,913
ARTICULATED CLAMPING ASSEMBLY
Filed March 4, 1957   3 Sheets-Sheet 2

INVENTORS
RAY W GOHRKE
NORMAN D THOMPSON
BY
*T. R. Geisler*
ATTORNEY

March 3, 1959 R. W. GOHRKE ET AL 2,875,913
ARTICULATED CLAMPING ASSEMBLY
Filed March 4, 1957 3 Sheets-Sheet 3

INVENTORS
RAY W GOHRKE
NORMAN D THOMPSON
BY
ATTORNEY

United States Patent Office 2,875,913
Patented Mar. 3, 1959

2,875,913
ARTICULATED CLAMPING ASSEMBLY
Ray W. Gohrke and Norman D. Thompson, Dallas, Oreg., assignors to Gerlinger Carrier Co., Dallas, Oreg., a corporation of Oregon Application March 4, 1957, Serial No. 643,801

3 Claims. (Cl. 214—654)

This invention relates to means exerting and maintaining a clamping hold on articles or groups of articles of such nature that the clamping means, in order to be effective, must be capable of adjusting itself to the general contour formed by the surface or plurality of surfaces around which the hold, by means of clamping pressure, is to be temporarily maintained.

A general object of the invention is to provide a self-adjusting clamping assembly which can be employed more efficiently and more effectively in place of the cables, chains or various clamp arms heretofore customarily used for such purposes.

A particular object of the invention is to provide a novel and improved clamping assembly which can be used on an industrial truck where such articles as barrels, cylindrical tanks, crates, groups of logs, pipes, poles, and the like, are to be raised and transported by the truck, and must be held securely on the lift of the truck while being so moved.

A more specific object is to provide a clamping assembly which will comprise a series of hinged or articulated substantially identical parts which can be readily adjusted so that the assembly as a unit can conform to a desired shape.

Another object of the invention is to provide a novel clamping assembly for an industrial truck which can be made a more or less permanent part of the truck, and, as such, will be operable entirely by the operator of the truck from this usual operating position.

A related object is to provide such an assembly which, although made part of the permanent equipment on the truck, will not interfere with the ordinary use of the truck during the times when the clamping assembly is not required.

A further object of the invention is to provide a clamping assembly of the type above indicated which will be entirely practical and thus simple in construction and involving no particular maintenance problems.

These objects and other incidental advantages are accomplished by the articulated clamping assembly constructed and employed as hereinafter briefly described with reference to the accompanying drawings.

Figures 1, 2:
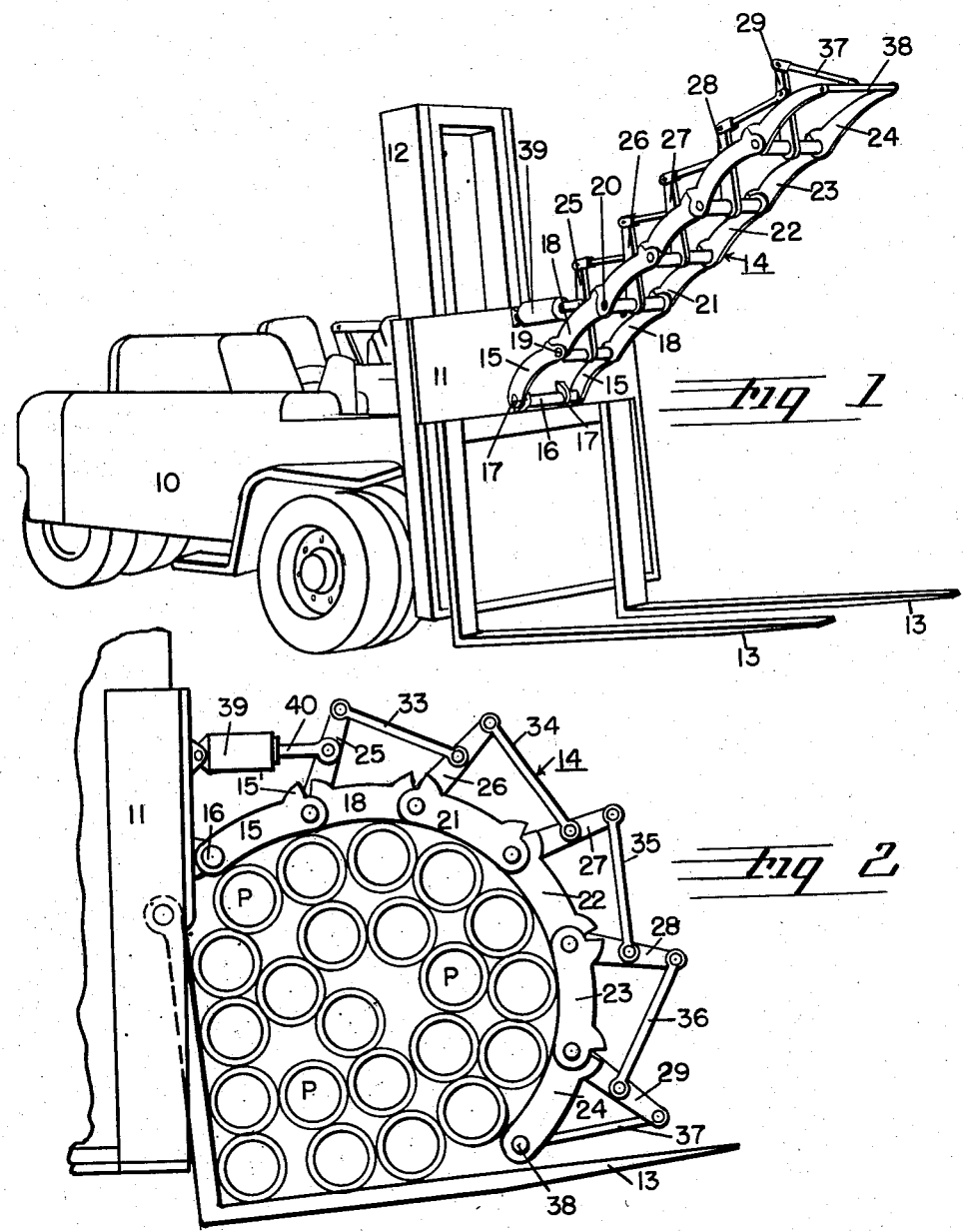
Figure 1 is a perspective view of an industrial or end-lift truck showing a clamping assembly, embodying the present invention, mounted on the truck, the clamping assembly being shown in raised position preparatory to being moved into clamping position over a load on the truck.
Figure 2 is a fragmentary elevation, drawn to a larger scale, showing a load on the end lift, or lifting forks, of the truck, and the clamping assembly set in clamping position over the load so as to hold the load firmly in position on the lift or lifting forks.

In Figure 1 the truck 10 shown is an industrial truck of well-known design equipped with a front end lift 11 which can be raised up or down on an upright frame or mast 12, the lift being provided with a pair of forwardly-extending load-engaging and supporting members or forks 13.

The clamping assembly, indicated as a whole by the reference character 14, includes a plurality of pairs of spaced, parallel, clamping beam members hingedly connected in series. The first pair 15, 15 of these beam members are supported on the opposite ends of a horizontal hinge shaft 16 which in turn is mounted in a pair of brackets 17, 17 secured on the lift 11 of the truck and preferably centrally positioned thereon.

The second pair of beam members 18, 18 are pivotally mounted on a hinge shaft 19 which in turn is mounted in the outer ends of the first pair of beam members 15, 15. Similarly a hinge shaft 20 is mounted in the outer ends of the beam members 18, 18 for the next pair of beam members 21, 21, and so on, the succeeding pairs of beam members 22, 23, and 24 being connected respectively in the same manner.

Figure 4:
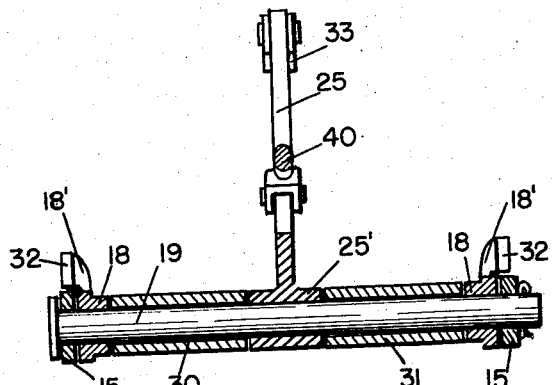
Figure 4 is a cross section on the line 4—4 of Figure 3.

A lever arm 25 is pivotally mounted at one end on the hinge shaft 19, being centrally positioned thereon. Identical lever arms 26, 27, 28, 29 (Figure 2) are similarly mounted on each of the succeeding hinge shafts for the succeeding pairs of beam members. The manner in which the lever arm 25 is mounted on its shaft 19 (and thus the manner in which the other lever arms are mounted on their respective shafts) is illustrated in Figure 4. The mounted end of the lever arm is broadened into a sleeve 25' rotatable on the shaft 19 and this broadened end of the lever arm is maintained in central position on the shaft 19 by a pair of positioning sleeves 30 and 31.

Figure 3:
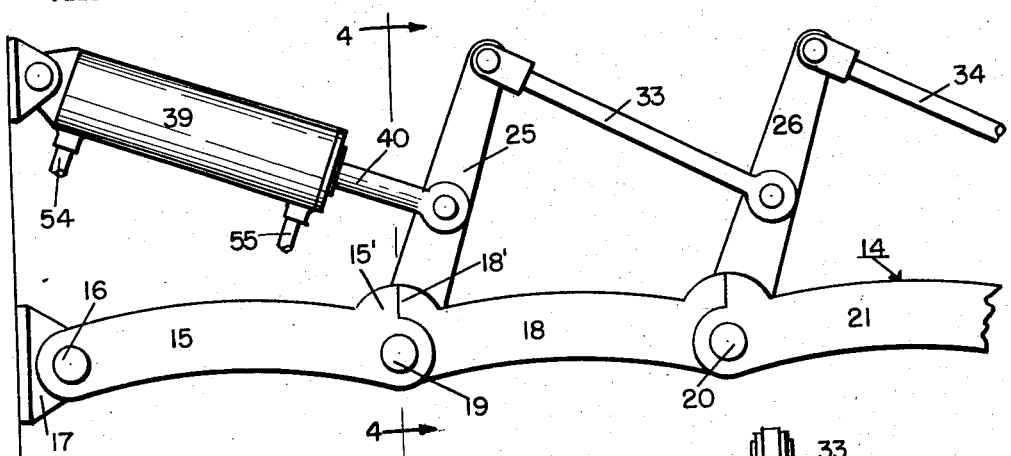
Figure 3 is a fragmentary, considerably enlarged elevation showing a portion of the clamping assembly by itself.

In Figure 4 the ends of the first pair of beam members 15, 15 and the respective adjacent ends of the second pair of beam members 18, 18 are shown in section on the ends of the hinge shaft 19. It will be noted that the beam members 18, 18 have integral offset lugs 18', 18', each terminating in the flat rear face or wall 32. These lugs are so arranged that these rear faces 32 will come into engagement with the front faces of similar lugs 15', 15' (see Figure 3) on the adjacent ends of the beam members 15. The purpose of these engaging pairs of lugs 18' and 15', as apparent from Figures 2 and 3, is to provide stops which will limit the extent to which each pair of beam members can swing upwardly (or away from cramping position) with respect to the preceding pair of beam members to which they are connected. The reason for this arrangement will be explained later.

A link 33 (Figure 3) has one end pivotally connected to the upper or outer end of the lever arm 25. The other end of the link 33 is pivotally connected to the next lever arm 26 intermediate the ends of the lever arm 26. Identical links 34, 35 and 36 (see Figure 2) connect each of the other lever arms with the next succeeding lever arm. The last lever arm 29 of the assembly is connected by a link 37 to a cross bar 38 (shown best in Figure 1) joining the terminal ends of the last pair of beam members 24, 24.

A hydraulic cylinder 39 has one end pivotally mounted on the lift 11 of the truck and centrally spaced above the hinge shaft 16 for the first pair of beam members 15, 15. The outer end of the shaft 40 of the hydraulic piston is pivotally connected to the first lever arm 25 intermediate the ends of the lever arm 25. The hydraulic cylinder 39 is provided with suitable ports at each end which are connected by tubes 54 and 55 (Figure 3) to a hydraulic source of power (not shown) on the truck through the intermediary of a reversing and control valve (not shown) positioned on the truck at a location convenient to the operator of the track.

From Figures 1, 2 and 3 it will now be apparent that inward movement of the hydraulic piston and piston rod 40 with respect to the hydraulic cylinder 39 (thus movement of the piston rod 40 to the left as viewed in these figures), will, if continued sufficiently, cause the entire assembly to be moved into and held in the inactive raised position of Figure 1. In this raised position the opposed stop lugs of the successive beam members, such as the lugs 15' and 18', will engage each other and thus cause the entire assembly to become, for the time being, in effect a composite pivoted arm held in an inactive raised position by the hydraulic cylinder and piston, and any downward bending of the composite arm intermediate its ends is prevented by the series of engaging lugs. In this position the assembly does not interfere with the ordinary operation of the truck under conditions in which no clamping or holding of a load on the lift is required.

Figure 2 illustrates how the clamping assembly is employed, for example, in the handling of a group of pipes indicated at P, which are to be moved by the lift truck. After the forks 13 of the end lift 11 are placed under the load of pipes the clamping device is used to gather the pipes into a compact group and to hold them clamped in such position and secured in place on the end lift.

When the clamping device is brought down over and around an object or group of objects, and thus moved from the position in Figure 1 to some such position as illustrated in Figure 2, the hydraulic cylinder 39 is operated to thrust the piston rod 40 outwardly, and the force is transmitted through the levers and links and in this way to the beam members throughout the entire assembly. The whole assembly deflects in a plane (thus in a substantially vertical plane when the assembly is mounted as illustrated in Figures 1 and 2), those beam members which offer the least resistance to such deflection responding first to the transmitted force. As each pair of beam members comes into contact with the load to be clamped the next pair of beam members are similarly acted upon by the transmitted force and brought into contact with the load, until all the pairs of beam members are either forcibly contacting the load or, if not in actual contact with the load, have reached a limit of mechanical movement with the assembly. With the load so clamped on the lift, the lift can be raised and the load moved by the truck as desired. When the load is ready for depositing the clamping assembly is released by reversing the hydraulic piston and this reverse movement, if sufficiently continued, will cause the assembly again to assume the position illustrated in Figure 1.

Figure 5:
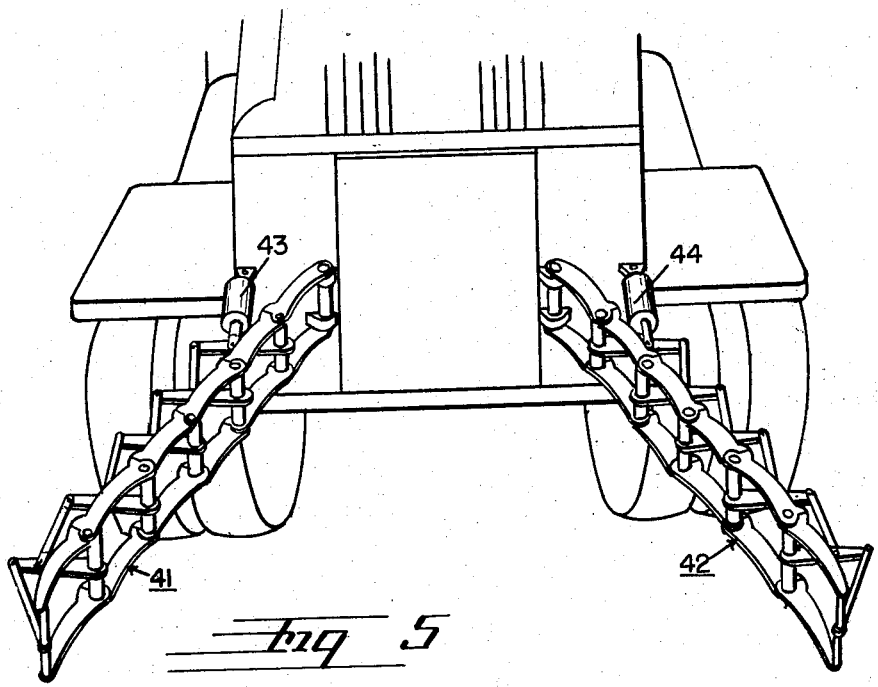
Figure 5 is a fragmentary elevation of the lift end of a similar truck illustrating the employment of a cooperating pair of such clamping assemblies arranged in a different manner for clamping a load laterally.

Figure 5 illustrates how two such identical clamping assemblies can be mounted opposite each other so as to move towards each other into lateral clamping position, or move away from each other into the open releasing position shown in this figure, moving always in the same plane. These two clamping assemblies, indicated in general by the reference characters 41 and 42, are each identical to the clamping assembly 14 of Figures 1, 2 and 3 and therefore need not be described in detail. The two assemblies are mounted on the truck to move laterally through the operation of the respective hydraulic cylinders 43 and 44 with their hydraulic pistons. As will be apparent, these two clamping assemblies can be brought together on opposite sides of a load, for example, on opposite sides of a cylindrical tank, and, when in clamping position, will directly support such load.

Figure 6:
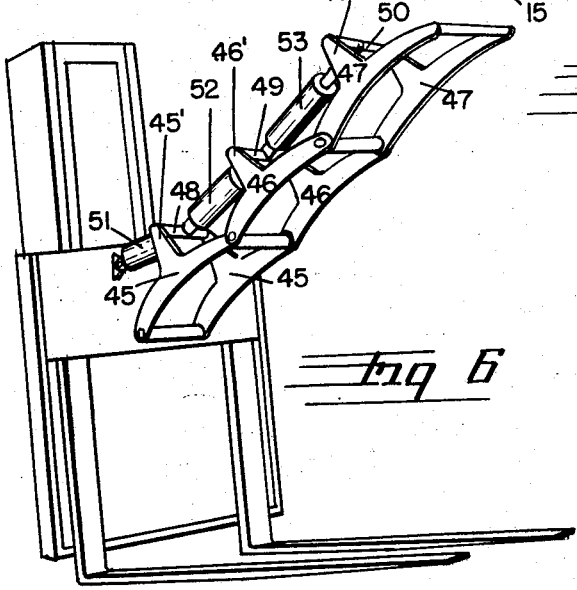
Figure 6 is a perspective view illustrating a slightly modified construction for the clamping assembly.

Obviously the number of pairs of beam members can be varied in the clamping assembly while the size of the individual members can also be varied. Furthermore other means could be used in place of the hydraulic cylinder and piston illustrated for operating the assembly Figure 6 illustrates a modified form in which the pairs of beam members may be made, as well as a modified manner in which the force may be transmitted separately to each of the pairs of beam members in the assembly. In this modified construction the consecutive pairs of beam members 45, 46 and 47 similarly are hingedly connected to each other, but the members are formed with central, integral, lever arms 45', 46' and 47' respectively which are connected by cross bars 48, 49 and 50 respectively. A hydraulic cylinder and piston 51 join the cross bar for the first pair of beam members 45 with the end lift on the truck, while a separate hydraulic cylinder and piston 52 join the first pair of beam members 45 with the second pair 46 and the third hydraulic cylinder and piston 53 join the two pairs 46 and 47. By operating each of these hydraulic cylinders separately it is obvious that a direct force can be applied to each pair of beam members separately as desired.

It would also be possible to substitute separate hydraulic cylinders in place of the links 33, 34, 35 and 36 in the construction shown in Figures 1 and 2 and accomplish a similar result. Combinations of the systems illustrated could also be used in transmitting the clamping force to the individual articulated beam members in the clamping assembly.

Various minor modifications in the clamping assemblies as illustrated and described would be possible without departing from the principle of the invention, and it is not intended to restrict the invention exactly to the particular assembly as described or to limit the invention otherwise than as set forth in the claims.

We claim:

1. In an industrial truck, the combination of an end lift and an articulated clamping assembly mounted on said end lift, said articulated clamping assembly consisting of a series of pairs of identical parallel beam members, said pairs consecutively hinged together by hinge shafts, all of said hinge shafts being parallel, a lever arm centrally mounted on each hinge shaft, said lever arms being substantially identical, a link connecting the outer end of each lever arm with the next consecutive lever arm, means connecting the outer end of the last lever arm with the ends of the last pair of beam members, a hinge mounting on said end lift for the first pair of said beam members, and a hydraulic cylinder and piston mounted on said end lift and operatively connected with the first of said lever arms.

2. In an industrial truck, the combination of an end lift and an articulated clamping assembly mounted on said end lift, said articulated clamping assembly comprising a series of pairs of similar parallel beam members, said pairs consecutively hinged together by hinge shafts, all of said hinge shafts being parallel, a lever arm mounted on each hinge shaft, a link connecting each lever arm with the next consecutive lever arm, means connecting the lever arm on the last of said hinge shafts with the free end of said assembly, limit stops on the ends of said members limiting the extent of hinged movement of said pairs of members with respect to each other in one direction, a hinge mounting on said end lift for the first pair of said beam members, and power means mounted on said end lift and operatively connected with the first of said lever arms.

3. In an industrial truck, the combination of an end lift and an articulated clamping assembly mounted on said end lift, said articulated clamping assembly including a series of pairs of identical parallel beam members, said pairs consecutively hinged to together by hinge shafts, all of said hinge shafts being parallel, a lever arm on each beam member, an element interconnecting the pair of lever arms for each pair of beam members a series of hydraulic cylinder and piston assemblies connecting said elements in succession, a hinge mounting on said end lift for the first pair of said beam members, and a hydraulic cylinder and piston mounted on said end lift and operatively connected with the first of said elements.

References Cited in the file of this patent

UNITED STATES PATENTS

| 1,693,074 | Falco | Nov. 27, 1928 |
| 2,574,045 | Lapham | Nov. 6, 1951 |
| 2,578,802 | Heidrick et al. | Dec. 18, 1951 |
| 2,583,075 | Anderson et al. | Jan. 22, 1952 |
| 2,707,007 | Shuff | Apr. 26, 1955 |

FOREIGN PATENTS

| 274,391 | Italy | May 20, 1930 |